United States Patent
Mashimo et al.

(10) Patent No.: US 12,367,743 B2
(45) Date of Patent: Jul. 22, 2025

(54) VALUABLE MEDIUM PROCESSING APPARATUS AND VALUABLE MEDIUM PROCESSING METHOD

(71) Applicant: GLORY LTD., Hyogo (JP)

(72) Inventors: Junji Mashimo, Hyogo (JP); Yasushi Kimura, Hyogo (JP)

(73) Assignee: GLORY LTD., Hyogo (JP)

(*) Notice: Subject to any disclaimer, the term of this patent is extended or adjusted under 35 U.S.C. 154(b) by 80 days.

(21) Appl. No.: 17/935,988

(22) Filed: Sep. 28, 2022

(65) Prior Publication Data

US 2024/0105030 A1    Mar. 28, 2024

(51) Int. Cl.
*G07F 19/00* (2006.01)
*G06Q 20/04* (2012.01)

(52) U.S. Cl.
CPC ......... *G07F 19/202* (2013.01); *G06Q 20/042* (2013.01)

(58) Field of Classification Search
CPC ............................ G07F 19/202; G06Q 20/042
USPC ........................................................ 235/7 R
See application file for complete search history.

(56) References Cited

U.S. PATENT DOCUMENTS

| | | | | |
|---|---|---|---|---|
| 6,502,052 | B1* | 12/2002 | Someya | G06M 9/00 702/172 |
| 8,640,945 | B1* | 2/2014 | McCormick | G07D 11/34 235/379 |
| 2005/0276458 | A1* | 12/2005 | Jones | G07D 7/12 382/135 |
| 2007/0210149 | A1 | 9/2007 | Osterberg | |
| 2009/0101723 | A1 | 4/2009 | Uehara | |
| 2009/0242626 | A1* | 10/2009 | Jones | G06Q 20/18 453/58 |
| 2017/0124813 | A1* | 5/2017 | Misener | G07D 3/00 |

FOREIGN PATENT DOCUMENTS

| | | |
|---|---|---|
| CN | 101438324 A | 5/2009 |
| EP | 3182387 A1 | 6/2017 |
| JP | 60-120490 A | 6/1985 |

OTHER PUBLICATIONS

Extended European Search Report dated Mar. 25, 2024.

* cited by examiner

*Primary Examiner* — Daniel A Hess
(74) *Attorney, Agent, or Firm* — Shih IP Law Group, PLLC.

(57) ABSTRACT

Provided is a valuable medium processing apparatus including: a plurality of devices each of which performs processing related to a transaction of a plurality of kinds of transactions for a plurality of kinds of valuable media; an input device which receives an operation to select a kind of the transaction and at least one of the plurality of kinds of valuable media for the transaction; and a controller which, in a case where an operation to select at least some of the plurality of kinds of valuable media for the transaction are received, operates at least some of the plurality of devices corresponding to the selected at least some of plurality of kinds of valuable media, respectively, in a first mode that causes the at least some of the plurality of devices to start the processing in an order that is predetermined.

15 Claims, 11 Drawing Sheets

VALUABLE MEDIUM PROCESSING APPARATUS AND VALUABLE MEDIUM PROCESSING METHOD

TECHNICAL FIELD

The present disclosure relates to a valuable medium processing apparatus and a valuable medium processing method.

BACKGROUND ART

A valuable medium processing apparatus that processes various kinds of valuable media such as a banknote, a coin, and a cheque comprises various kinds of devices for processing transactions for various kinds of valuable media to be processed.

SUMMARY

A valuable medium processing apparatus according to the present disclosure comprises: a plurality of devices each of which performs processing related to a transaction of a plurality of kinds of transactions for a plurality of kinds of valuable media; an input device which receives an operation to select a kind of the transaction and at least one of the plurality of kinds of valuable media for the transaction; and a controller which, in a case where an operation to select at least some of the plurality of kinds of valuable media for the transaction are received, operates at least some of the plurality of devices corresponding to the selected at least some of plurality of kinds of valuable media, respectively, in a first mode that causes the at least some of the plurality of devices to start the processing in an order that is predetermined.

DESCRIPTION OF EMBODIMENTS

Figure 1:
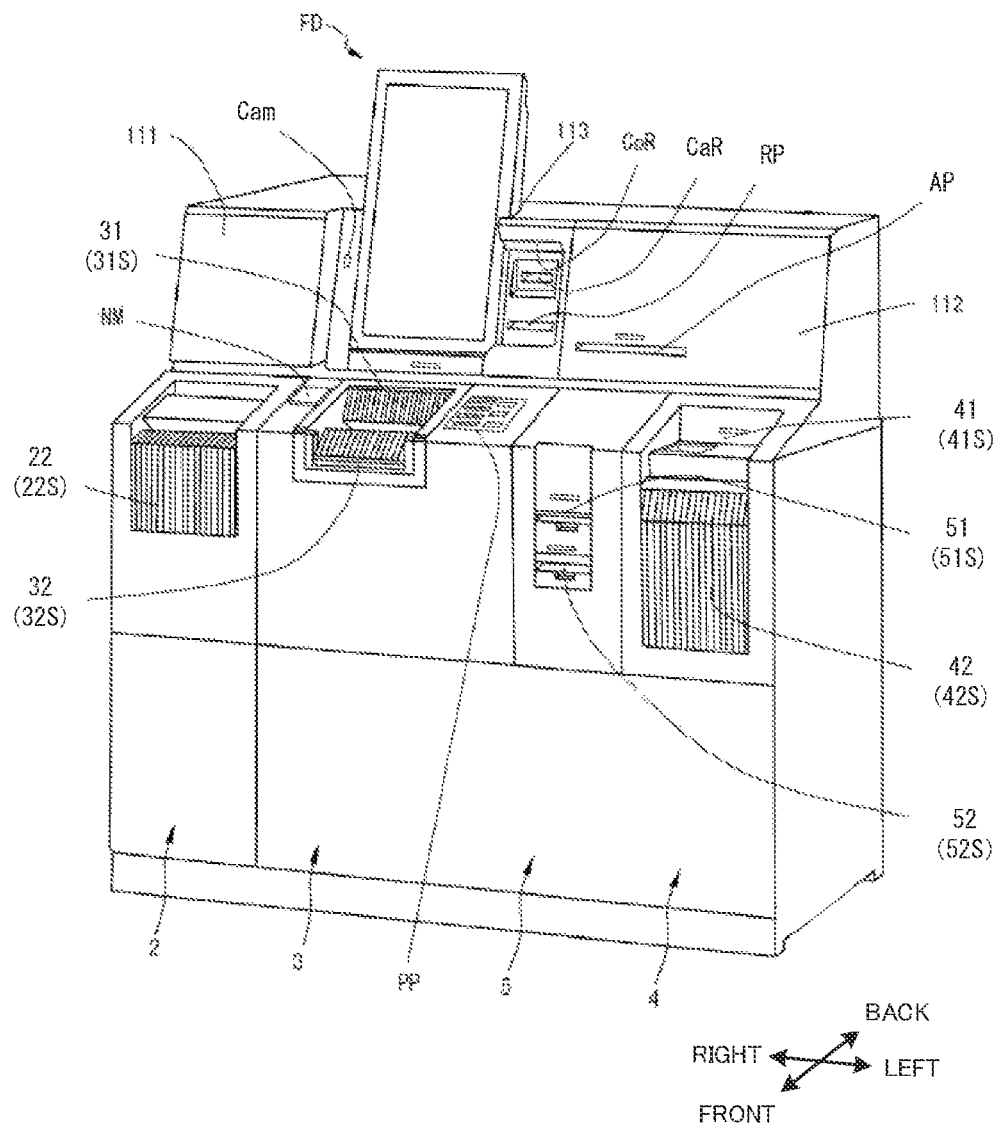
FIG. 1 is an external view of a valuable medium processing apparatus according to an aspect of the present disclosure when viewed from the front side.

FIG. 1 is an external view of a valuable medium processing apparatus 100 according to an aspect of the present disclosure when viewed from the front side. Note that, FIG. 1 indicates the front, back, left, and right directions with respect to the valuable medium processing apparatus 100, and the description herein will be made based on these directions.

The valuable medium processing apparatus 100 is installed in various kinds of facilities comprising a store (financial store) of a financial institution such as a bank, a store (distribution store) such as a convenience store, or the like. The valuable medium processing apparatus 100 is an apparatus that performs various kinds of processing related to transactions for various kinds of valuable media. As specific examples of the valuable media, banknotes, coins, cheques, and the like can be mentioned, for example. The coins comprise rolled coins and loose coins. The banknotes may comprise bound notes and loose notes. As specific examples of the transaction, depositing, dispensing, money change, transfer, and the like can be mentioned.

The valuable medium processing apparatus 100 comprises a plurality of devices. At least one device of the plurality of devices processes a different kind of valuable media from the other devices. The valuable medium processing apparatus 100 comprises: a rolled coin device 2 that performs processing related to a transaction for the rolled coin; a banknote device 3 that performs processing related to a transaction for the loose note; a loose coin device 4 that performs processing related to a transaction for the loose coin; and a cheque device 5 that performs processing related to a transaction for the cheque. The rolled coin device 2, the banknote device 3, the loose coin device 4, and the cheque device 5 are housed in a housing 1 in a state in which the devices are arranged in a line along the left-right direction. In the example indicated in FIG. 1, the rolled coin device 2, the banknote device 3, the cheque device 5, and the loose coin device 4 are disposed in this order from left to right in a case where the valuable medium processing apparatus 100 is viewed from the front side. Further, the valuable medium processing apparatus 100 may also comprise a bound note device that performs processing related to a transaction for the bound note. The bound note device may be disposed between the rolled coin device 2 and the banknote device 3.

With respect to each device, at least one of an inlet and/or an outlet thereof is provided on the front surface of the housing 1. The rolled coin device 2 comprises an outlet 22 for dispensing a rolled coin. The outlet 22 is provided with a shutter 22S for opening and closing the outlet 22. The banknote device 3 comprises an inlet 31 for receiving a banknote and an outlet 32 for dispensing a banknote. The inlet 31 is provided with a shutter 31S for opening and closing the inlet 31, and the outlet 32 is provided with a shutter 32S for opening and closing the outlet 32. The loose coin device 4 comprises an inlet 41 for receiving a loose coin and an outlet 42 for dispensing a loose coin. The inlet 41 is provided with a shutter 41S for opening and closing the inlet 41, and the outlet 42 is provided with a shutter 42S for opening and closing the outlet 42. The cheque device 5 comprises an inlet 51 for receiving a cheque and an outlet 52 for feeding out a cheque. The inlet 51 is provided with a shutter 51S for opening and closing the inlet 51, and the outlet 52 is provided with a shutter 52S for opening and closing the outlet 52. Note that, the outlet 52 may be an outlet section for returning a cheque inputted through the inlet 51.

Note that, although FIG. 1 indicates an example in which each inlet and each outlet are provided with a shutter, respectively, each inlet and each outlet may not be provided with a shutter in the present disclosure.

The front surface of the housing 1 is provided with a front display FD and a PIN pad PP as user interfaces of the valuable medium processing apparatus 100. The front display FD has a structure (a touch screen) in which a touch pad and a thin display are stacked, and is capable of performing various kinds of displaying to the user and receiving an input operation by the user. The PIN pad PP receives an input of a PIN (personal identification number) by the user. The PIN pad PP is, for example, a numeric keypad. The front display FD is an example of the display in the present disclosure. Further, the front display FD and the PIN pad PP are an example of the input device in the present disclosure. The input device may be a device operated by the user, or a communication interface for receiving signals from the outside. Note that, the user means a person who performs a transaction by using the valuable medium processing apparatus 100 and is, for example, a customer who uses a facility in which the valuable medium processing apparatus 100 is installed.

In the example indicated in FIG. 1, the front display FD and the PIN pad PP are provided at positions corresponding to the banknote device 3 in the left-right direction. The front display FD may be provided above the banknote device 3. The PIN pad PP may be provided adjacent to the inlet 31 or the outlet 32 of the banknote device 3. Thus, the front display FD and the PIN pad PP are provided at positions at which the user who is utilizing the banknote device 3 easily operates the front display FD and the PIN pad PP.

Further, a card reader CaR, a code reader CoR, a receipt printer RP, an A4 printer AP, a camera Cam, and an NFC reader NM are provided on the front surface of the housing 1. The card reader CaR reads an ATM card of a bank account, a credit card, and the like, for example. The code reader CoR reads a barcode, a 2D code, and the like. The receipt printer RP and the A4 printer AP print information on a result of processing performed by the user using the valuable medium processing apparatus 100, or the like, and provide the user therewith. The camera Cam photographs the face or the like of the user who utilizes the valuable medium processing apparatus 100 or the manager of the valuable medium processing apparatus 100, and uses the photographed face or the like as part of processing history information. The camera Cam may also be used to generate face image data to be utilized for face identification of the user or the manager. The manager of the valuable medium processing apparatus 100 is a person who manages the valuable medium processing apparatus 100 and valuable media and is, for example, an employee or the like of a facility where the valuable medium processing apparatus 100 is installed. The NFC reader NM performs communication by NFC (Near Field Communication) with a portable terminal (such as a smartphone and a tablet terminal) of the user, for example.

Figure 2:
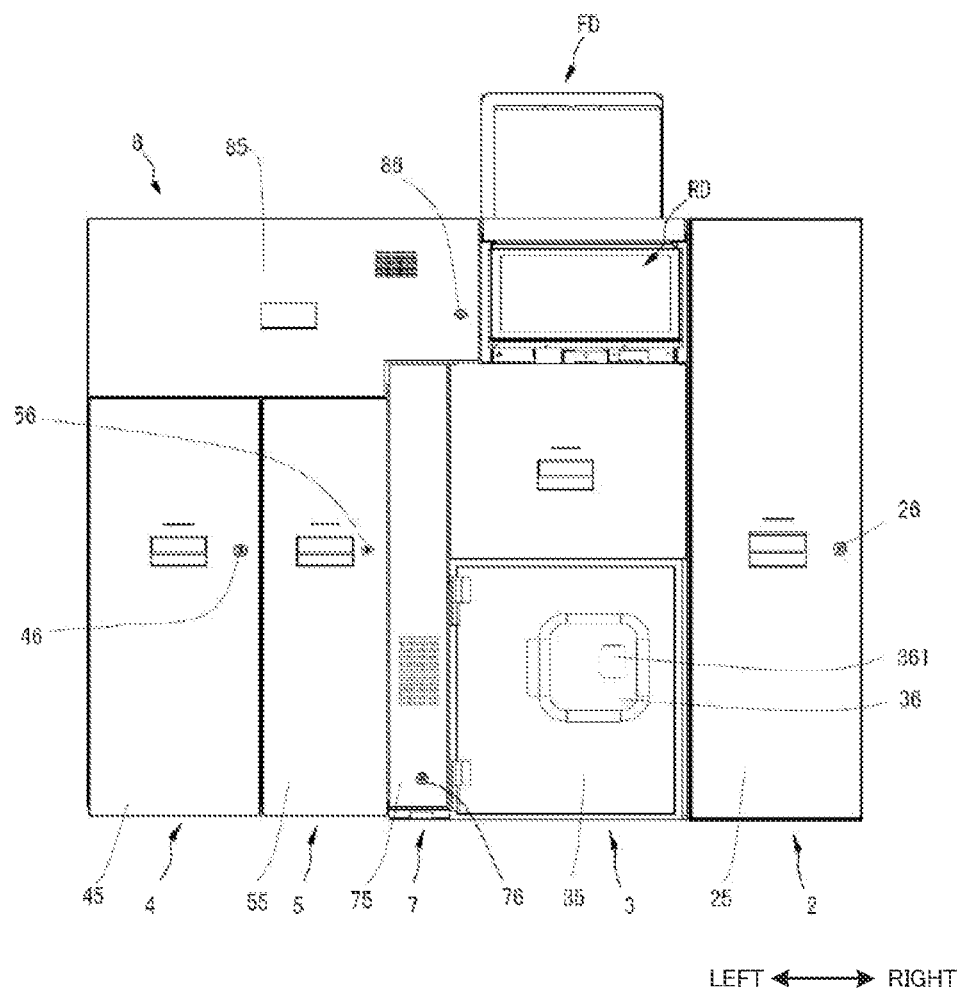
FIG. 2 is an external view of the valuable medium processing apparatus when viewed from the back.

FIG. 2 is an external view of the valuable medium processing apparatus 100 when viewed from the back. A door 25 of the rolled coin device 2, a door 35 of the banknote device 3, a door 45 of the loose coin device 4, and a door 55 of the cheque device 5 are provided on the back surface of the housing 1. These doors 25, 35, 45, and 55 allow the manager or the like of the valuable medium processing apparatus 100 to access the interior of each device.

The doors 25, 35, 45, and 55 are lockable by locks 26, 36, 46, and 56. The banknote device 3 may also comprise a key input device 361 for inputting a personal identification number for unlocking the lock 36.

Further, in the example indicated in FIG. 2, a controller box 7 is provide between the banknote device 3 and the cheque device 5. The controller box 7 stores a controller 10 to be described later. The controller box 7 comprises a door 75 and a lock 76.

A peripheral device box 8 is provided on a side above the banknote device 3, the loose coin device 4, and the cheque device 5. The peripheral device box 8 houses main parts of the front display FD, the PIN pad PP, the card reader CaR, the code reader CoR, the receipt printer RP, the A4 printer AP, the camera Cam, the NFC reader NM, and the like that are indicated in FIG. 1. The peripheral device box 8 comprises a door 85 and a lock 86.

Further, a rear display RD is provided on a side above the banknote device 3 on the back surface of the housing 1. In the same manner as the front display FD, the rear display RD has a structure (a touch screen) in which a touch pad and a thin display are stacked. The rear display RD is capable of performing various kinds of displaying to the manager and receiving an input operation by the manager.

Figure 3:
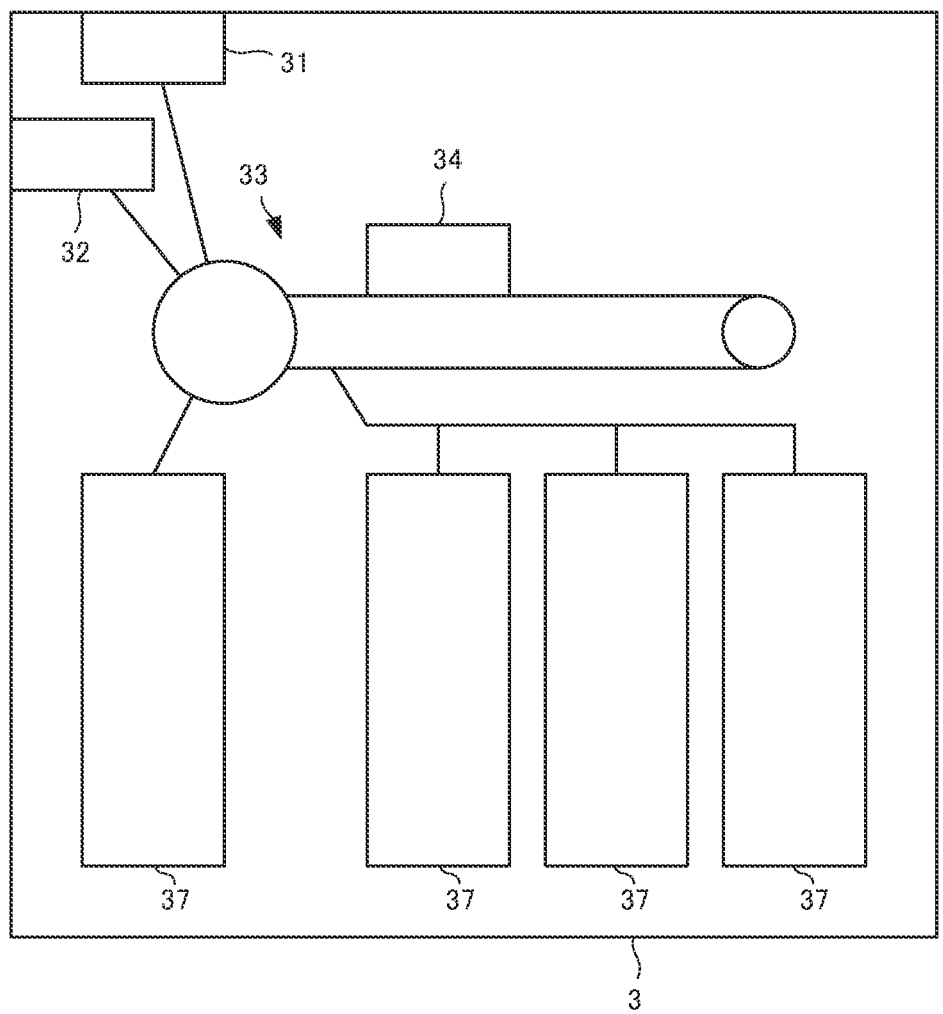
FIG. 3 illustrates an example of an internal structure of a banknote device.

Next, an internal structure of the banknote device 3 will be described as an example of an internal structure of each device of the valuable medium processing apparatus 100. FIG. 3 illustrates the internal structure of the banknote device 3. The banknote device 3 comprises a transport unit 33, a recognition unit 34, and a storage unit 37.

The transport unit 33 transports a banknote among the inlet 31, the outlet 32, and the storage unit 37. The transport unit 33 is formed of, for example, a belt and a roller. A banknote fed out from the inlet 31 is transported by the transport unit 33 to one of the outlet 32 and the storage unit 37.

The recognition unit 34 is disposed near the inlet 31 on the path of the transport unit 33, and recognizes the denomination, fitness, authenticity, and the like of a banknote fed out from the inlet 31.

The storage unit 37 stores a banknote. The storage unit 37 may comprise: a recycle unit configured to be capable of feeding out a banknote that has been stored once; and a collection unit configured to be incapable of feeding out a banknote that has been stored once. Further, the storage unit 37 may also comprise a temporary storage unit capable of feeding out a banknote, which temporarily stores a banknote until processing related to a transaction is completed. In addition, the storage unit 37 may also comprise a plurality of storage boxes, and storage boxes in which banknotes are stored for each denomination may be determined in advance.

The devices other than the banknote device 3, that is, the rolled coin device 2, the loose coin device 4, and the cheque device 5 have the same or a similar internal structure as or to that of the banknote device 3 described above, or have a known internal structure. Accordingly, detailed descriptions of the internal structures of the rolled coin device 2, the loose coin device 4, and the cheque device 5 will be omitted.

Figure 4:
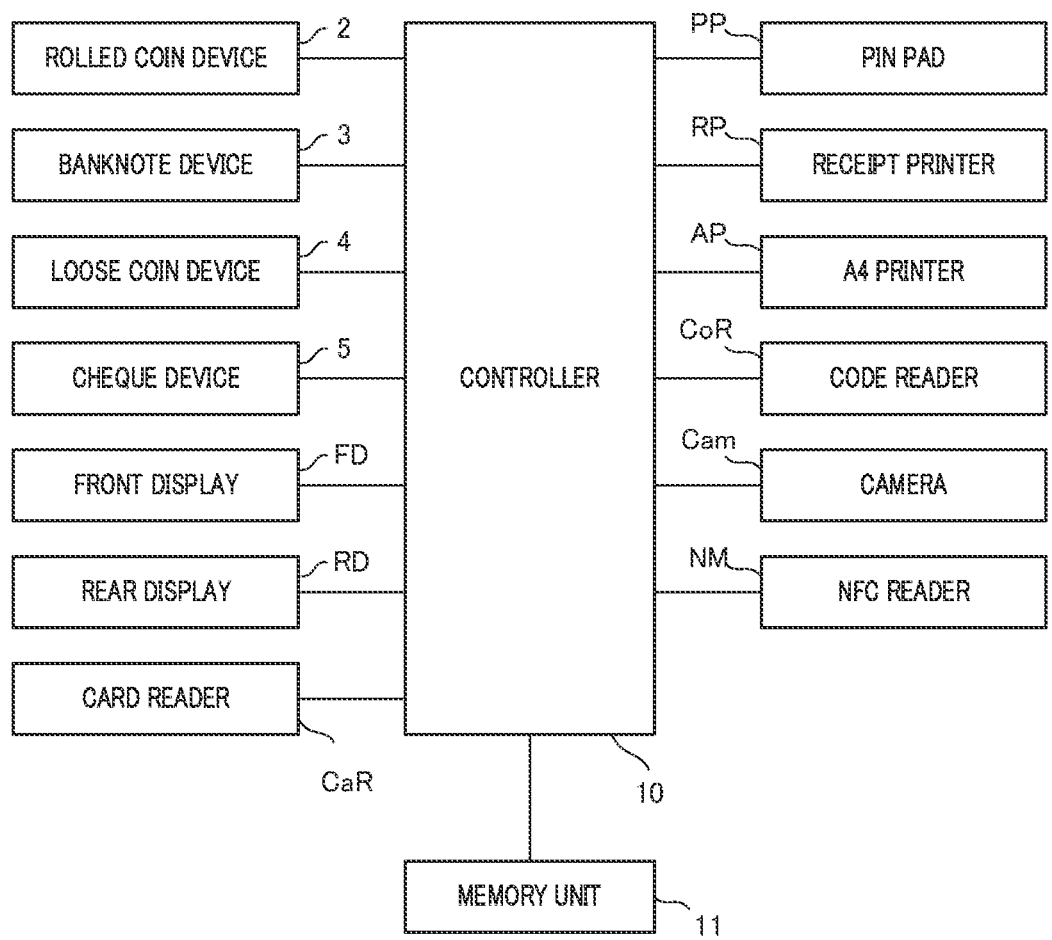
FIG. 4 is a block diagram of the valuable medium processing apparatus.

FIG. 4 is a block diagram of the valuable medium processing apparatus 100. The controller 10 controls each configuration of the valuable medium processing apparatus 100. A memory unit 11 stores various kinds of data, programs, and the like that are required for processing to be executed by the controller 10.

Figure 5:
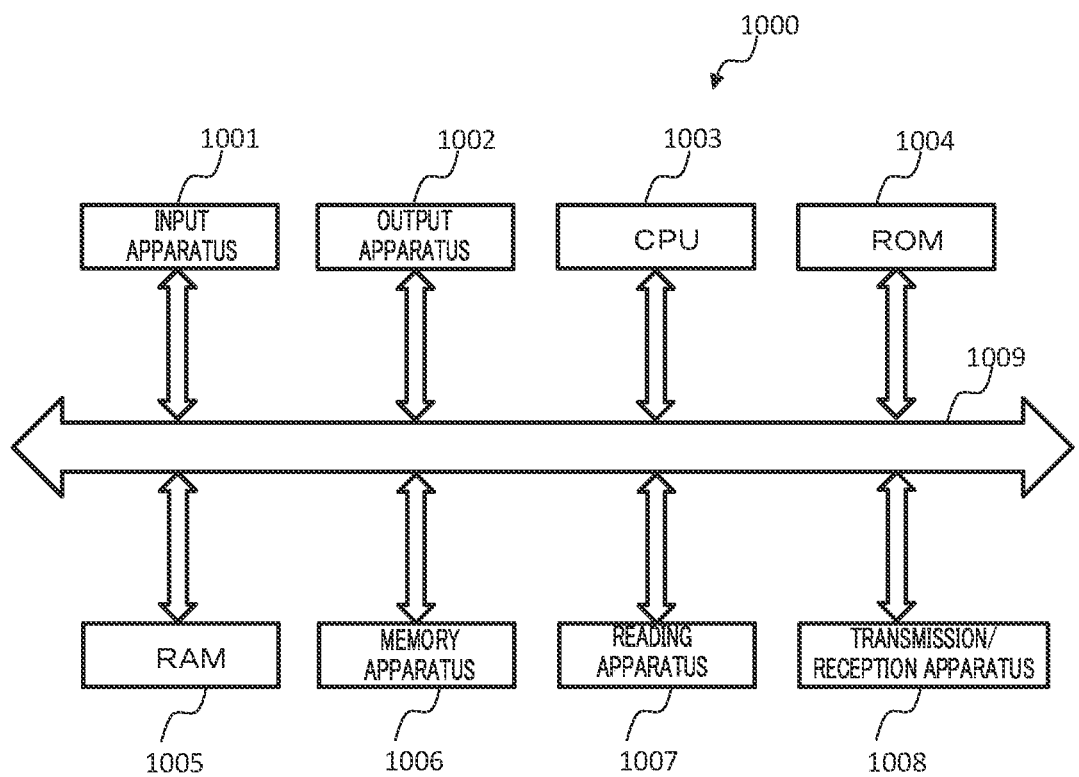
FIG. 5 illustrates an example of a hardware configuration of the valuable medium processing apparatus.

FIG. 5 illustrates an example of a hardware configuration of the valuable medium processing apparatus 100 as a computer.

The computer 1000 comprises an input apparatus 1001, an output apparatus 1002, a CPU 1003, a ROM (Read Only Memory) 1004, a RAM (Random Access Memory) 1005, a memory apparatus 1006, a reading apparatus 1007 for reading information from various kinds of recording media, and a transmission/reception apparatus 1008, and the respective parts are connected by a bus 1009. The front display FD and the PIN pad PP which are indicated in FIG. 1 or the like and the rear display RD indicated in FIG. 2 or the like are examples of the input apparatus 1001. The front display FD and the rear display RD are examples of the output apparatus 1002. The memory unit 11 indicated in FIG. 4 is an example of the memory apparatus 1006.

Then, the reading apparatus 1007 reads a program for implementing the functions of the respective apparatuses described above from a recording medium that records the program, and causes the memory apparatus 1006 to store the program. Alternatively, the transmission/reception apparatus 1008 communicates with a system apparatus connected to a network and causes the memory apparatus 1006 to store a program downloaded from the system apparatus.

Then, the CPU 1003 copies the program stored in the memory apparatus 1006 to the RAM 1005, sequentially reads instructions comprised in the program from the RAM 1005, and executes the instructions, thereby operating each block of the valuable medium processing apparatus 100 indicated in FIG. 4.

Figure 6:
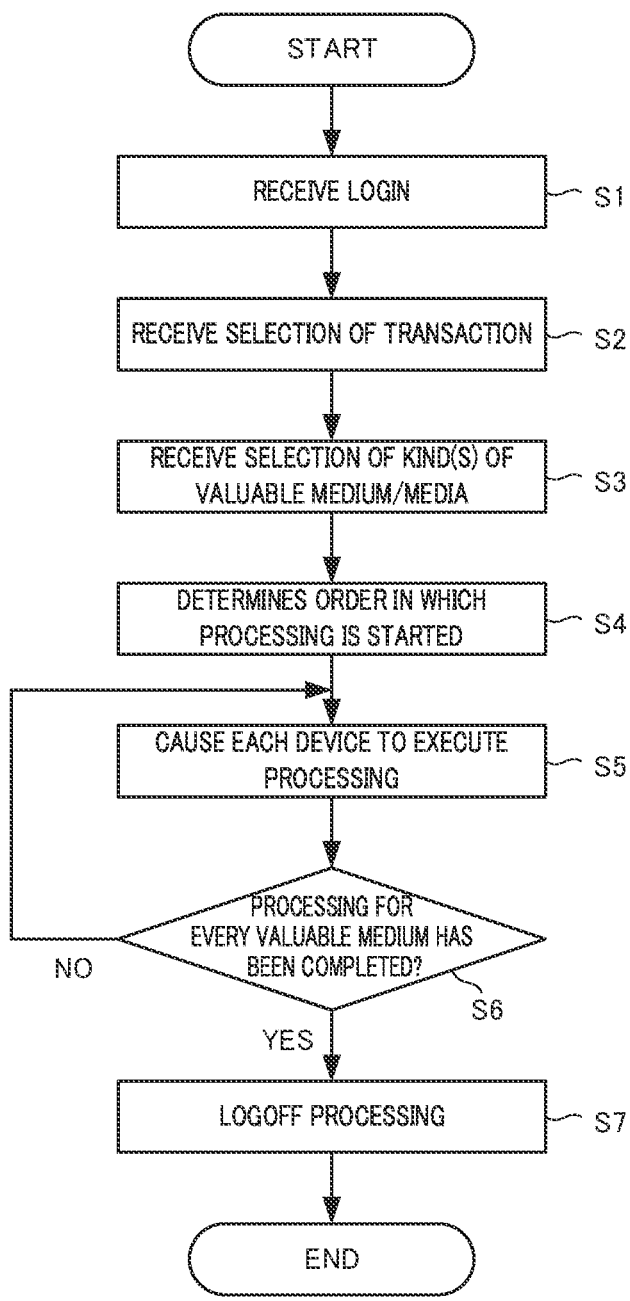
FIG. 6 is a flowchart illustrating an operation example of the valuable medium processing apparatus.

Next, an operation example of the valuable medium processing apparatus 100 will be described. FIG. 6 is a flowchart illustrating an operation example of the valuable medium processing apparatus 100.

In step S1 of FIG. 6, the valuable medium processing apparatus 100 receives login by the user. The login is performed based on, for example, information read by the card reader CaR from an ATM card or credit card of the user, information obtained by the front display FD or the PIN pad PP receiving an input operation of identification information (such as a password) by the user, and the like. The identification information is transmitted, for example, to an external computer communicably connected to the valuable medium processing apparatus 100. The external computer performs identification processing by using the received identification information, and transmits a result of the identification processing to the valuable medium processing apparatus 100.

In step S2, the valuable medium processing apparatus 100 receives the user's selection of a transaction. In step S2, for example, in a case where the user performs an operation to select one of options of various kinds of transactions displayed on the front display FD, the valuable medium processing apparatus 100 determines that selection of a transaction has been received. Note that, in step S2, only one kind of transaction among a plurality of kinds of transactions is selectable.

In step S3, the valuable medium processing apparatus 100 receives selection of a valuable medium(s) for the transaction selected in step S2. In step S3, for example, in a case where the user performs an operation to select one of options of various kinds of valuable media displayed on the front display FD, the valuable medium processing apparatus 100 determines that selection of a valuable medium has been received. Note that, in step S3, it is possible to select a plurality of kinds of valuable media.

The kinds of valuable media that can be selected in step S3 may be limited depending on the kind of transaction selected in step S2. For example, in a case where selection of the "depositing transaction" is received in step S2, the "banknote", the "loose coin", and the "cheque" are provided as options in step S3, and the user can select (a) desired valuable medium/media from these options. That is, in this case, the valuable medium processing apparatus 100 does not receive the depositing transaction for the rolled coin.

For example, in a case where selection of the "dispensing transaction" is received in step S2, the "banknote", the "loose coin", and the "rolled coin" are provided as options in step S3, and the user can select (a) desired valuable medium/media from these options. That is, in this case, the valuable medium processing apparatus 100 does not receive the dispensing transaction for the cheque.

Thus, the user's selection of a kind (only one kind) of transaction and a kind(s) (one kind or a plurality of kinds) of valuable medium/media for the transaction is received by the processing up to step S3. The operations after step S4 in FIG. 6 indicate operations in a case where selection of a plurality of kinds of valuable media is received in step S3.

In order to execute the transaction received in step S2, processing by devices corresponding to the plurality of kinds of valuable media received in step S3, respectively, is performed. In step S4, the valuable medium processing apparatus 100 determines, based on priorities set in advance, an order in which the processing by each device is started. Details of the processing by each device will be described later.

For example, priorities may be set in advance for each kind of transaction by the manager of the valuable medium processing apparatus 100, and priority information indicating the set priorities may be stored in advance in the memory unit 11. Alternatively, priorities may also be automatically set for each kind of transaction based on the apparatus configuration of the valuable medium processing apparatus 100. Alternatively, priorities may also be automatically set for each kind of transaction based on a result of tallying the number of times the processing by each device has been performed.

A specific example of a method of setting priorities will be described. In the case of the depositing transaction, priorities are set in advance in an order of the loose coin, the cheque, and the banknote, for example. The reason why the loose coin is highest in priority is to prevent the user from erroneously inputting a loose coin into an inlet other than that of the loose coin device 4.

Since the loose coin is stiffer than the banknote, when, for example, a loose coin is erroneously inputted into the inlet 31 of the banknote device 3, a burden may be applied to the internal structure of the banknote device 3 or a failure may occur. Such an erroneous input can be prevented by performing reception of a deposit of a loose coin before reception of deposits of other kinds of valuable media.

With respect to the priorities of the cheque and the banknote in the depositing transaction, for example, one for which the money amount to be handled in a transaction is assumed to be smaller may be set higher in priority. For example, the money amount of the cheque to be handled in one transaction may be larger than the money amount of the banknote to be handled in the one transaction depending on facilities, regions, or countries where the valuable medium processing apparatus 100 is installed. In such a case, priority information in which the banknote is higher than the cheque in priority may be set in advance.

With respect to the priorities of the cheque and the banknote in the depositing transaction, for example, one for which the number of times the one is handled is more may be set higher in priority. In this case, for example, in a certain facility, the number of times one is handled for transactions in the past may be tallied for each kind of valuable medium and priorities may be determined based on a result of the tallying.

In the case of the dispensing transaction, priorities are set in advance in an order of the banknote, the rolled coin, and the loose coin, for example. These priorities are set in consideration of the user's leaving behind. It is anticipated that the user's leaving behind will occur much more for a valuable medium whose dispensing transaction is performed last. Accordingly, by further lowering the priority of a valuable medium for which the money amount to be handled in one transaction is assumed to be smaller, the amount of damage to the user can be suppressed as small as possible in a case where leaving behind occurs.

Note that, priorities to be set in advance for each transaction represent an example, and other priorities may be set. For example, priorities of valuable media corresponding to each device may be determined based on the distance between the front display FD as the display and the inlet or outlet of each device.

A description will be given with a specific example. In the valuable medium processing apparatus 100, as illustrated in FIG. 1, a plurality of devices is arranged side by side in the left-right direction, and the front display FD and the PIN pad PP are disposed at positions corresponding to the banknote device 3 in the left-right direction. For this reason, for example, in a case where a first user who is utilizing the valuable medium processing apparatus 100 performs a transaction for the banknote, the displaying content of the front display FD is shielded, even when there is a second user waiting for his/her turn, by the body of the first user and is hardly visible to the second user.

In a case where the first user performs a transaction corresponding to a device away from the front display FD, however, the displaying content of the front display FD may be visible to the second user since the first user needs to move his/her body in the left-right direction. As a specific example, in a case where the first user wishes a transaction for the loose coin, the first user moves his/her body in accordance with the distance between the front display FD and the inlet 41 or the outlet 42 of the loose coin device 4. In this case, nothing shields the front display FD from the second user, and thus, the displaying content of the front display FD is visible to the second user.

The front display FD may display information on a transaction performed by the first user. For example, in the depositing transaction, the user performs the depositing transaction for a plurality of valuable media, each device then counts the depositing amount for each kind of valuable medium, and the front display FD displays the total money amount. For security reasons, it is very unfavorable for the first user that the total money amount of the deposit will be known to the second user. Accordingly, a valuable medium corresponding to a device whose distance from the front display FD is large may be set to be higher in priority in order to make the displaying of the total money amount less visible to the second user. In the example indicated in FIG. 1, in the depositing transaction, the loose coin corresponding to the loose coin device 4 whose distance from the front display FD is largest may be set to be highest in priority, and the banknote corresponding to the banknote device 3 whose distance from the front display FD is smallest may be set to be lowest in priority.

In the case of the dispensing transaction, at the time of starting the transaction, dispensing amounts for each valuable medium may be displayed on the front display FD and then dispensing from each device may be performed. At the timing when the dispensing from each device is performed, it is assumed that the displaying of the dispensing amounts on the front display FD have disappeared. In this case, contrary to the depositing transaction, the banknote corresponding to the banknote device 3 whose distance from the front display FD is smallest may be set to be highest in priority, and the loose coin corresponding to the loose coin device 4 whose distance from the front display FD is largest may be set to be lowest in priority.

Note that, such methods of determining priorities are examples and the present disclosure is not limited thereto.

The priority information may be stored in the memory unit 11, for example, based on an operation to the front display FD or the rear display RD by the manager of the valuable medium processing apparatus 100.

FIG. 6 will be described again. In step S5, in accordance with the order determined in step S4, the valuable medium processing apparatus 100 causes the processing related to, among the plurality of kinds of valuable media selected in step S3, a valuable medium for which the processing has not been completed and which is first in the order, to be executed by the corresponding device. Details of the processing to be executed by each device will be described later.

In step S6, the valuable medium processing apparatus 100 determines whether the processing related to every valuable medium selected in step S3 has been completed. In a case where the valuable medium processing apparatus 100 determines that the processing related to every valuable medium has been completed (step S6: YES), the valuable medium processing apparatus 100 advances the operation to step S7. Otherwise (step S6: NO), the valuable medium processing apparatus 100 returns the operation to step S5 and causes the execution until every processing is completed.

In step S7, the valuable medium processing apparatus 100 causes the transaction to be completed and causes the user to log off. Specifically, the valuable medium processing apparatus 100 discharges the ATM card or credit card from the card reader CaR, and causes the front display FD to display that every transaction has been completed and that care should be taken not to leave behind anything.

Figure 7:
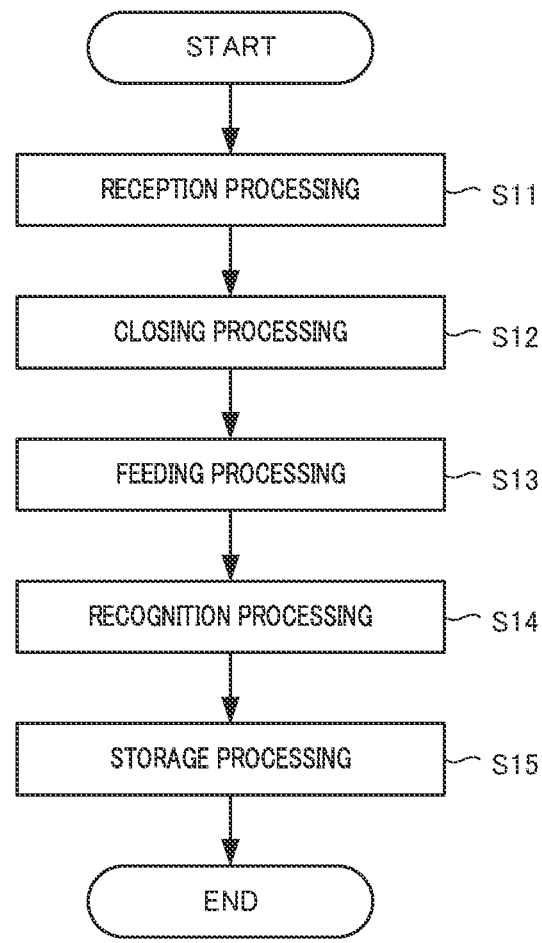
FIG. 7 is a flowchart provided for describing processing related to a depositing transaction.
Figure 8:
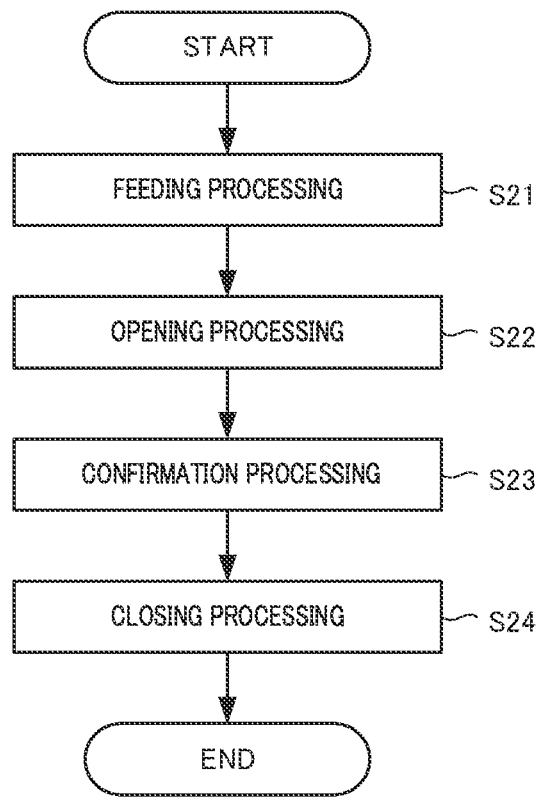
FIG. 8 is a flowchart provided for describing processing related to a dispensing transaction.

Next, details of the processing by each device for executing a transaction will be described. In FIGS. 7 and 8, processing by the banknote device 3 will be described as an example. Note that, processing by the other devices is substantially the same as the processing by the banknote device 3 to be described below except that the valuable media corresponding to each device are used for the processing.

FIG. 7 is a flowchart provided for describing processing related to the depositing transaction. As illustrated in FIG. 7, the processing related to the depositing transaction comprises reception processing in step S11, closing processing in step S12, feeding processing in step S13, recognition processing in step S14, and storage processing in step S15.

The reception processing in step S11 is processing of opening the shutter 31S of the inlet 31 (see FIG. 1) and receiving an input of a banknote by the user. In a case where the inlet 31 is not provided with a shutter, an input of a banknote by the user may be received by causing the front display FD to perform displaying to prompt the user to input a banknote, for example. The banknote device 3 may determine that the reception processing has been completed in a case where a sensor provided in the inlet 31 detects that a banknote has been inputted into the inlet 31. Alternatively, the banknote device 3 may determine that the reception processing has been completed in a case where an input by the user, which indicates that an input of a banknote has been completed, is received.

The closing processing in step S12 is processing of closing the shutter 31S in a case where the reception processing has been completed.

The feeding processing in step S13 is processing of feeding out a banknote inputted into the inlet 31 to the transport unit 33 (see FIG. 3). The feeding processing may be performed before the closing processing. That is, the closing processing may be performed after the feeding processing has been completed.

The recognition processing in step S14 is processing of recognizing, by the recognition unit 34 (see FIG. 3), a banknote that is being transported by the transport unit 33.

The storage processing in step S15 is processing of storing a banknote in the storage unit 37. When a deposited banknote is stored in the storage unit 37, the processing related to the depositing transaction is completed.

Next, FIG. 8 is a flowchart provided for describing processing related to the dispensing transaction. As illustrated in FIG. 8, the processing related to the dispensing transaction comprises feeding processing in step S21, opening processing in step S22, confirmation processing in step S23, and closing processing in step S24.

The feeding processing in step S21 is processing of feeding out a banknote(s) corresponding to a dispensing amount designated by the user from the storage unit 37 to the outlet 32 (see FIG. 1).

The opening processing in step S22 is processing of opening the shutter 32S of outlet 32. Thus, the user can take out a banknote from the outlet 32.

The confirmation processing in step S23 is processing of confirming whether taking out of a banknote has been completed. This confirmation processing may be performed based on, for example, whether a sensor disposed in the outlet 32 detects a banknote.

The closing processing in step S24 is processing of closing the shutter 32S of the outlet 32 (see FIG. 1) in a case where it is confirmed that taking out of a banknote has been completed. As described above, the processing related to the dispensing transaction is completed by confirming that every dispensed banknote has been taken out, and by closing the shutter 32S of the outlet 32.

Figure 9:
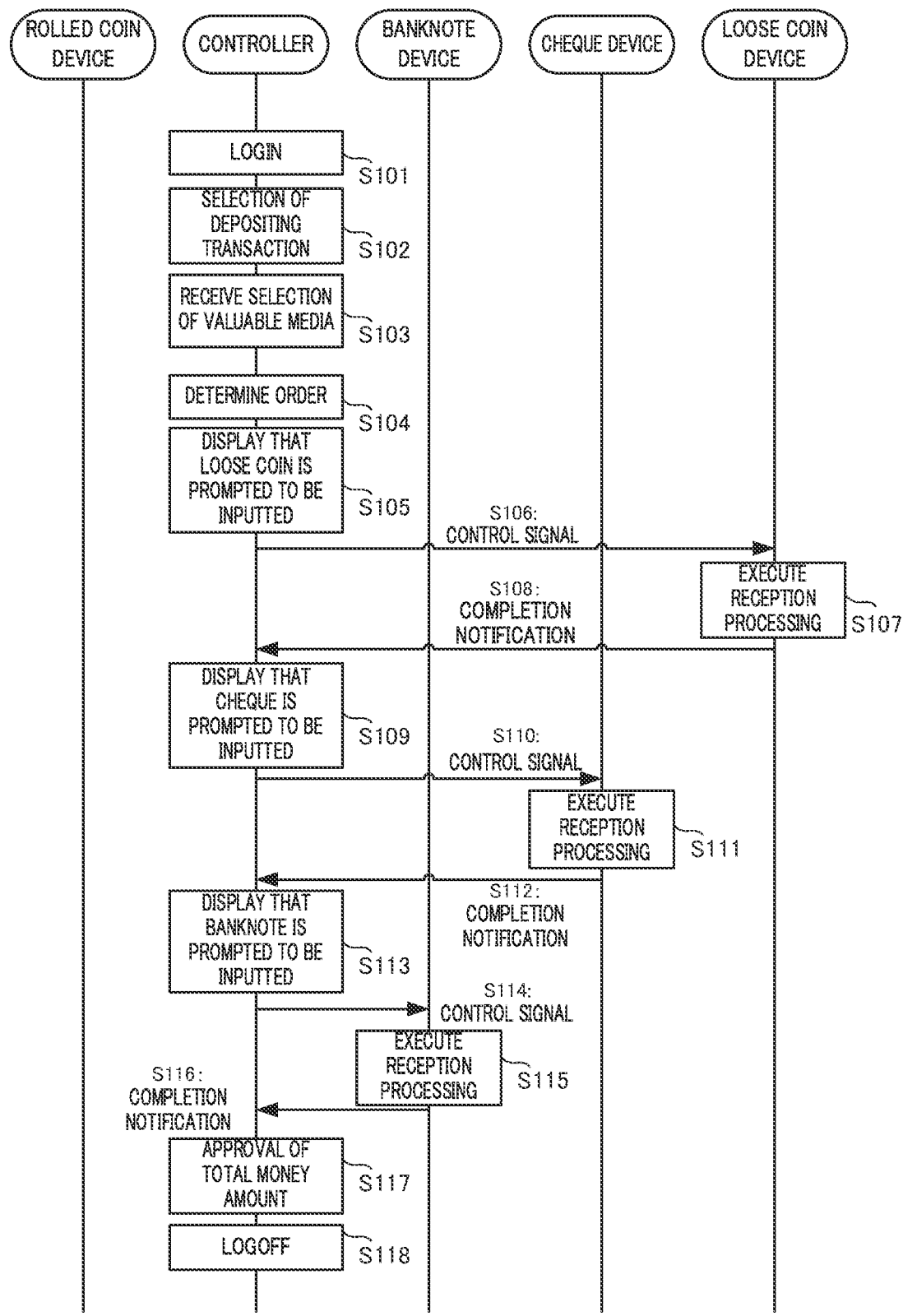
FIG. 9 is a sequence diagram describing operations of a controller and each device in a case where the depositing transaction is selected as a transaction.

Next, a more specific operation in a case where the depositing transaction is performed in the valuable medium processing apparatus 100 will be described. FIG. 9 is a sequence diagram describing operations of the controller 10 and each device in a case where the depositing transaction is selected as a transaction.

In step S101, the controller 10 receives login by the user.

In step S102, the controller 10 receives the user's selection of the depositing transaction.

In step S103, the controller 10 receives the user's selection of valuable media for the depositing transaction. Here, it is assumed that the banknote, the cheque, and the loose coin have been selected as the valuable media for the depositing transaction.

In step S104, the controller 10 determines, based on priorities set in advance, an order in which the processing by the devices corresponding to the selected valuable media is started. Here, it is assumed that the order is determined in an order of the loose coin, the cheque, and the banknote.

In step S105, the controller 10 causes the front display FD to perform displaying to the user that the user is prompted to input a loose coin. Then, in step S106, the controller 10 transmits a control signal to start processing related to the depositing transaction to the loose coin device 4. Note that, the transmission of the control signal in step S106 may be performed before the displaying in step S105.

In step S107, the loose coin device 4 starts the processing related to the depositing transaction based on the reception of the control signal from the controller 10. Thus, the loose coin device 4 executes reception processing of receiving an input of a loose coin.

In step S108, when the reception processing has been completed, the loose coin device 4 transmits a completion notification to the controller 10. Thereafter, the loose coin device 4 may advance the remaining processing related to the depositing transaction.

In step S109, the controller 10 causes the front display FD to perform displaying to the user that the user is prompted to input a cheque when the reception processing by the loose coin device 4 has been completed. Then, in step S110, the controller 10 transmits a control signal to start processing related to the depositing transaction to the cheque device 5. Note that, the transmission of the control signal in step S110 may be performed before the displaying in step S109.

In step S111, the cheque device 5 starts the processing related to the depositing transaction based on the reception of the control signal from the controller 10. Thus, the cheque device 5 first executes reception processing of receiving an input of a cheque.

In step S112, when the reception processing has been completed, the cheque device 5 transmits a completion notification to the controller 10. Thereafter, the cheque device 5 may advance the remaining processing related to the depositing transaction.

In step S113, the controller 10 causes the front display FD to perform displaying to the user that the user is prompted to deposit a banknote when the reception processing by the cheque device 5 has been completed. Then, in step S114, the controller 10 transmits a control signal to start processing related to the depositing transaction for the banknote to the banknote device 3. Note that, the transmission of the control signal in step S114 may be performed before the displaying in step S113.

In step S115, the banknote device 3 starts the processing related to the depositing transaction based on the reception of the control signal from the controller 10. Thus, the banknote device 3 first executes reception processing of receiving an input of a banknote.

In step S116, when the reception processing has been completed, the banknote device 3 transmits a completion notification to the controller 10. Thereafter, the banknote device 3 may advance the remaining processing related to the depositing transaction.

In step S117, the controller 10 causes the front display FD to display each total money amount of the loose coin, the cheque, and the banknote, of which the deposits have been received, and causes the user to approve the depositing money amount. Specifically, in a case where the front display FD is caused to display the total money amount and options of whether to approve the total money amount as the depositing money amount and the user selects an option indicating the approval, the controller 10 may determine that the displayed total money amount has been approved as the depositing money amount.

Note that, each total money amount of the loose coin, the cheque, and the banknote may be calculated by the controller 10 based on results of recognition processing performed by the loose coin device 4, the cheque device 5, and the banknote device 3 after steps S108, S111, and S114, respectively.

When the depositing money amount is approved by the user, the controller 10 causes the user to log off in step S118. Thus, the depositing transaction in the valuable medium processing apparatus 100 is completed.

Note that, in the example indicated in FIG. 9, the operations in a case where the loose coin, the cheque, and the banknote are selected for the depositing transaction have been described. However, for example, in a case where the loose coin and the cheque are selected and the banknote is not selected, the operations related to the loose coin and the cheque may be executed and the operations related to the banknote may not be executed.

In steps S108 and S112 in the example indicated in FIG. 9, when the reception processing related to the depositing transaction for one valuable medium has been completed, the processing related to the depositing transaction for the next valuable medium is started. However, the processing for the next valuable medium may not be started when the reception processing has been completed. For example, the processing for the next valuable medium may be started when the closing processing in step 12 in FIG. 7, the feeding processing in step S13 in FIG. 7, or the storage processing in step S15 in FIG. 7 has been completed, for example. However, the time required for the entire processing related to the depositing transaction can be shortened by causing the processing related to the depositing transaction for the next valuable medium to be started at an earliest possible stage of the processing related to the depositing transaction for one valuable medium.

In the example indicated in FIG. 9, the total money amount is displayed after the reception processing related to every valuable medium has been completed. However, the total money amount may be displayed each time the reception processing for one kind of valuable medium has been completed, for example. In this case, the user's approval may be requested each time the reception processing for one kind of valuable medium has been completed.

Figure 10:
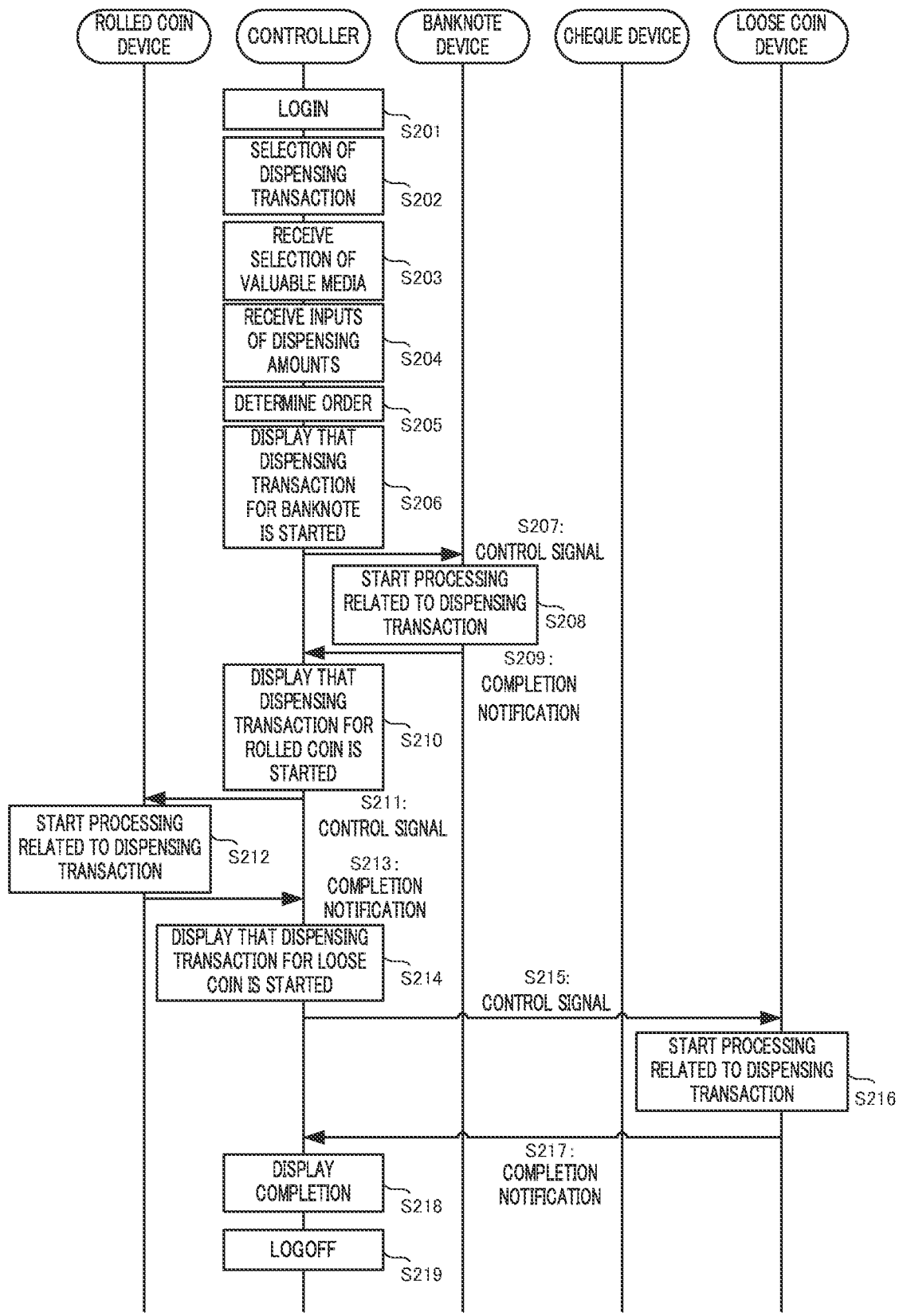
FIG. 10 is a sequence diagram describing operations of the controller and each device in a case where the dispensing transaction is selected as a transaction.

FIG. 10 is a sequence diagram describing operations of the controller 10 and each device in a case where the dispensing transaction is selected as a transaction.

In step S201, the controller 10 receives login by the user.

In step S202, the controller 10 receives the user's selection of the dispensing transaction.

In step S203, the controller 10 receives the user's selection of valuable media for the dispensing transaction. Here, it is assumed that the banknote, the rolled coin, and the loose coin are selected as the valuable media for the dispensing transaction.

In step S204, the controller 10 receives the user's inputs of designating dispensing amounts for each valuable medium.

In step S205, the controller 10 determines, based on priorities set in advance, an order in which the processing by the devices corresponding to the selected valuable media is executed. Here, it is assumed that the order is determined in an order of the banknote, the rolled coin, and the loose coin.

In step S206, the controller 10 causes the front display FD to perform displaying to the user that the dispensing transaction for the banknote is started. The displaying that the dispensing transaction is started may comprise displaying to prompt the user to take out a banknote fed out to the outlet 32. Then, in step S207, the controller 10 transmits a control signal to start processing related to the dispensing transaction for the banknote to the banknote device 3. The control signal comprises information indicating a dispensing amount of a banknote(s), which is designated by the user. Note that, the transmission of the control signal in step S207 may be performed before the displaying in step S206.

In step S208, the banknote device 3 starts the processing related to the dispensing transaction based on the reception of the control signal from the controller 10. Thus, the banknote device 3 sequentially executes each processing indicated in FIG. 8.

When the processing related to the dispensing transaction is completed, the banknote device 3 transmits a completion notification, which indicates that the processing has been completed, to the controller 10 in step S209. Here, in a case where the closing processing indicated in FIG. 8 has been completed, the banknote device 3 may determine that the processing related to the dispensing transaction has been completed. Alternatively, in a case where the confirmation processing indicated in FIG. 8 has been completed, the banknote device 3 may determine that the processing related to the dispensing transaction has been completed.

In step S210, the controller 10 that has received the completion notification causes the front display FD to perform displaying to the user that the dispensing transaction for the rolled coin is started. The displaying that the dispensing transaction is started may comprise displaying to prompt the user to take out a rolled coin fed out to the outlet 22. Then, in step S211, the controller 10 transmits a control signal to start processing related to the dispensing transaction for the rolled coin to the rolled coin device 2. The control signal comprises information indicating a dispensing amount of a rolled coin(s), which is designated by the user. Note that, the transmission of the control signal in step S211 may be performed before the displaying in step S210.

In step S212, the rolled coin device 2 starts the processing related to the dispensing transaction based on the reception of the control signal from the controller 10. Thus, the rolled coin device 2 sequentially executes each processing related to the dispensing transaction.

When the processing related to the dispensing transaction has been completed, the rolled coin device 2 transmits a completion notification, which indicates that the processing has been completed, to the controller 10 in step S213. Here, in a case where the closing processing has been completed, the rolled coin device 2 may determine that the processing related to the dispensing transaction has been completed. Alternatively, in a case where the confirmation processing has been completed, the rolled coin device 2 may determine that the processing related to the dispensing transaction has been completed.

In step S214, the controller 10 that has received the completion notification causes the front display FD to perform displaying to the user that the dispensing transaction for the loose coin is started. The displaying that the dispensing transaction is started may comprise displaying to prompt the user to take out a loose coin fed out to the outlet 42. Then, in step S215, the controller 10 transmits a control signal to start processing related to the dispensing transaction for the loose coin to the loose coin device 4. The control signal comprises information indicating a dispensing amount of a loose coin(s), which is designated by the user. Note that, the transmission of the control signal in step S215 may be performed before the displaying in step S214.

In step S216, the loose coin device 4 starts the processing related to the dispensing transaction based on the reception of the control signal from the controller 10. Thus, the loose coin device 4 sequentially executes each processing related to the dispensing transaction.

When the processing related to the dispensing transaction has been completed, the loose coin device 4 transmits a completion notification, which indicates that the processing has been completed, to the controller 10 in step S217. Here, in a case where the closing processing has been completed, the loose coin device 4 may determine that the processing related to the dispensing transaction has been completed. Alternatively, in a case where the confirmation processing has been completed, the loose coin device 4 may determine that the processing related to the dispensing transaction has been completed.

In step S218, the controller 10 that has received the completion notification causes the front display FD to perform displaying to the user that the dispensing transaction for the selected valuable media has been completed. Then, in step S219, the controller 10 causes the user to log off. Thus, the dispensing transaction in the valuable medium processing apparatus 100 is completed.

As described above, the valuable medium processing apparatus 100 according to an aspect of the present disclosure can receive selection of a plurality of kinds of valuable media at one time for one kind of transaction. The valuable medium processing apparatus 100 executes processing of devices corresponding to the selected plurality of valuable media, respectively. Then, the valuable medium processing apparatus 100 determines, based on priorities set in advance, an order in which the processing by the devices is started, and sequentially executes the processing of every device in accordance with the determined order. Here, the valuable medium processing apparatus 100 performs processing for a plurality of kinds of valuable media in one transaction. Accordingly, the time taken for the entire transaction can be shortened in comparison with a case where, in one transaction, only one kind of valuable medium is received for the transaction and it is not until the transaction is completed that a transaction for another valuable medium is started. Further, in one transaction, the valuable medium processing apparatus 100 can further shorten the time taken for the entire transaction by starting processing by a device corresponding to a second valuable medium before every processing by a device corresponding to a first valuable medium is completed.

By setting appropriate priorities for executing processing for valuable media in advance, the valuable medium processing apparatus 100 according to an aspect of the present disclosure can cause devices corresponding to each valuable medium to start processing in a more appropriate order. Specifically, in the depositing transaction, setting priorities such that processing for the loose coin is first started makes it possible to prevent a loose coin from being inputted into the banknote device 3 or the like. Further, in the depositing transaction, priorities are set such that the processing starts from a valuable medium corresponding to a device whose physical distance from the front display FD as the display is far, and thus, the displaying content of the front display FD can be made less visible to the second user waiting for his/her turn by the body of the first user using the valuable medium processing apparatus 100, and it is possible to improve the security.

In the valuable medium processing apparatus 100, the controller 10 may be transitionable to one of a plurality of operation modes. The plurality of operation modes comprises, for example, at least two of a first operation mode, a second operation mode, and a third operation mode.

The first operation mode is, as described in the embodiment described above, an operation mode that receives selection of a plurality of kinds of valuable media for one transaction and that causes devices corresponding to the selected plurality of kinds of valuable media, respectively, to execute processing in a predetermined order (see FIG. 6).

The second operation mode is, for example, the same as the first operation mode in terms of receiving selection of a plurality of kinds of valuable media for one transaction, but is an operation mode that causes devices corresponding to the selected plurality of kinds of valuable media to perform processing in parallel.

Figure 11:
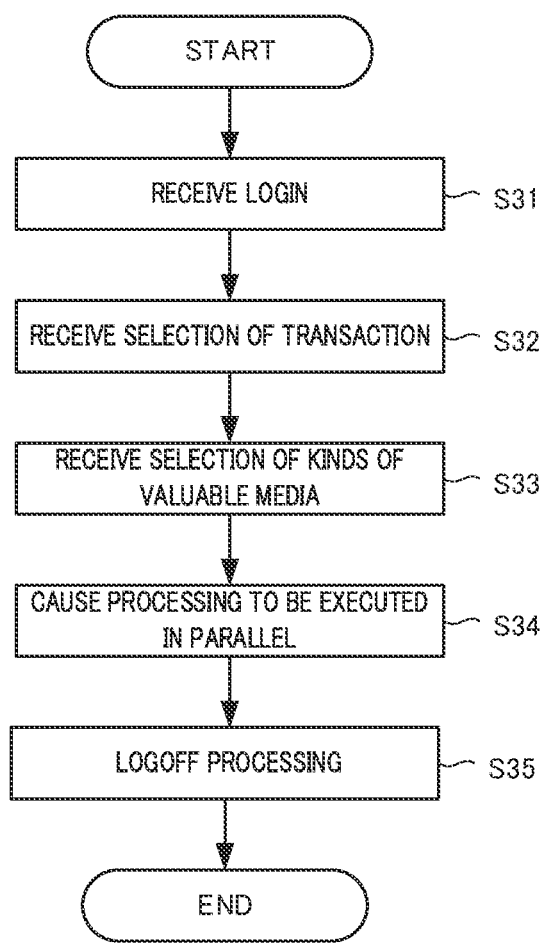
FIG. 11 is a flowchart illustrating an operation example of the valuable medium processing apparatus in a second operation mode.

FIG. 11 is a flowchart illustrating an operation example of the valuable medium processing apparatus 100 in the second operation mode.

In step S31 of FIG. 11, the valuable medium processing apparatus 100 receives login by the user.

In step S32, the valuable medium processing apparatus 100 receives the user's selection of a transaction.

In step S33, the valuable medium processing apparatus 100 receives selection of valuable media for the transaction selected in step S32.

In step S34, the valuable medium processing apparatus 100 causes the devices corresponding to the selected valuable media to execute processing related to the transaction in parallel.

In step S35, the valuable medium processing apparatus 100 causes the transaction related to the user to be completed and causes the user to log off.

The second operation mode can also shorten the time taken for the entire transaction in comparison with a case where only one kind of valuable medium is received for a transaction at one time and it is not until processing related to the transaction for the one kind of valuable medium is completed that a transaction for another valuable medium is started.

The third operation mode is, for example, an operation mode that does not receive selection of a plurality of kinds of valuable media for one transaction and that does not receive a transaction for another valuable medium until a transaction for one kind of valuable medium is completed.

Which operation mode among the plurality of operation modes the controller 10 operates in may be determined, for example, based on an operation by the manager of the valuable medium processing apparatus 100.

Alternatively, which operation mode among the plurality of operation modes the controller 10 operates in may also be determined, for example, based on a current time of a region where the valuable medium processing apparatus 100 is installed or a date. For example, at a time or in a period when numerous users are expected to utilize the valuable medium processing apparatus 100, the controller 10 may automatically transition to the first operation mode or the second operation mode in order to shorten the time required for a transaction. Conversely, at a time or in a period when few users are expected to utilize the valuable medium processing apparatus 100, the controller 10 may transit to the third operation mode.

Alternatively, which operation mode among the plurality of operation modes the controller 10 operates in may also be determined, for example, by attributes of the user who utilizes the valuable medium processing apparatus 100. The attributes of the user indicate, for example, the frequency of utilizing the valuable medium processing apparatus 100, the kind of a credit card or ATM card, and the like.

As a specific example, a facility where the valuable medium processing apparatus 100 is installed may issue a special card to the user who utilizes the valuable medium processing apparatus 100 almost every day, for example. In a case where the user logs in by using such a special card as described above, the controller 10 may automatically transition to the first operation mode or the second operation mode, and in a case where the user logs in by using a general card, the controller 10 may automatically transition to the third operation mode, for example. Further, in a case where the manager of the valuable medium processing apparatus 100 logs in by using a card different from the user's card, the controller 10 may automatically transit to the second operation mode.

As described above, the valuable medium processing apparatus 100 according to the variations described above can appropriately switch among the first operation mode, which operates as described in the foregoing embodiment, and the other operation modes, and therefore can perform an appropriate operation in accordance with the user.

What is claimed is:

1. A valuable medium processing apparatus, comprising:
a plurality of devices each of which performs processing related to at least one of a plurality of kinds of valuable media, the plurality of kinds of valuable media comprising at least two kinds among a rolled coin, a loose coin, a banknote, and a cheque;
an input device which receives an operation to select at least one of a plurality of kinds of transactions and at least one of the plurality of kinds of valuable media, the plurality of kinds of transactions comprising a depositing transaction of depositing the plurality of kinds of valuable media into the valuable medium processing apparatus and a dispensing transaction of dispensing the plurality of kinds of valuable media from the valuable medium processing apparatus; and
a controller which, in a case where an operation to select the depositing transaction and at least some of the plurality of kinds of valuable media is received, is operable in an operation mode among a plurality of operation modes comprising a first operation mode and a second operation mode,
wherein:
the first operation mode is a mode that causes at least some of the plurality of devices corresponding to the selected at least some of plurality of kinds of valuable media, respectively, to start the processing in an order that is predetermined,
the second operation mode is a mode that causes the at least some of the plurality of devices, respectively, to perform the processing in parallel, and
the controller causes the operation mode to transition based on a predetermined condition, and the predetermined condition is related to an attribute of a user who utilizes the valuable medium processing apparatus.

2. The valuable medium processing apparatus according to claim 1, wherein the controller determines the order based on priorities of the plurality of kinds of valuable media, at least one of the priorities having been determined in advance for each of the plurality of kinds of transactions.

3. The valuable medium processing apparatus according to claim 1, wherein:
the plurality of kinds of valuable media comprises the loose coin, and
in a case where the loose coin is selected as one of the plurality of kinds of valuable media, the controller causes at least one of the plurality of devices that corresponds to the loose coin to start the processing first in the first operation mode.

4. The valuable medium processing apparatus according to claim 1, further comprising a display that performs displaying related to the depositing transaction, wherein
the controller causes the plurality of devices in descending order of distance from the display to start the processing in the first operation mode.

5. The valuable medium processing apparatus according to claim 1, wherein:

the plurality of devices comprises a first device corresponding to a first valuable medium, the first device comprising an inlet, a recognition unit, and a storage unit, and
in a case where the first valuable medium is selected as one of the plurality of valuable media, the processing comprises:
reception processing of receiving an input of the one of the plurality of valuable media into the inlet;
feeding processing of feeding out the one of the plurality of valuable media from the inlet;
recognition processing of recognizing, by the recognition unit, the one of the plurality of valuable media; and
storage processing of storing, by the storage unit, the one of the plurality of valuable media.

6. The valuable medium processing apparatus according to claim 5, wherein
when the first device has completed the feeding processing in the first operation mode, the controller causes a second device next in the order to start the processing, the second device corresponding to a second valuable medium.

7. The valuable medium processing apparatus according to claim 5, wherein
when the first device has completed the storage processing in the first operation mode, the controller causes a second device next in the order to start the processing, the second device corresponding to a second valuable medium.

8. The valuable medium processing apparatus according to claim 5, wherein:
the first device further comprises a depositing shutter that opens and closes the inlet,
the processing further comprises closing processing of closing the depositing shutter, and
when the first device has completed the closing processing in the first operation mode, the controller causes a second device next in the order to start the processing, the second device corresponding to a second valuable medium.

9. The valuable medium processing apparatus according to claim 1, wherein the plurality of operation modes further comprises a third operation mode, the third operation mode being a mode that receives an operation to select only one of the plurality of kinds of valuable medium for the depositing transaction and that causes one of the plurality of devices corresponding to the selected one of the plurality of kinds of valuable medium to perform the processing.

10. The valuable medium processing apparatus according to claim 1, wherein
the predetermined condition is related to an operation to the input device.

11. The valuable medium processing apparatus according to claim 1, wherein the predetermined condition is related to a current time.

12. A valuable medium processing apparatus, comprising:
a plurality of devices each of which performs processing related to at least one of a plurality of kinds of valuable media, the plurality of kinds of valuable media comprising at least two kinds among a rolled coin, a loose coin, a banknote, and a cheque;
an input device which receives an operation to select at least one of a plurality of kinds of transactions and at least one of the plurality of kinds of valuable media, the plurality of kinds of transactions comprising a depositing transaction of depositing the plurality of kinds of valuable media into the valuable medium processing apparatus and a dispensing transaction of dispensing the plurality of kinds of valuable media from the valuable medium processing apparatus;

a display which performs displaying related to at least one of the plurality of kinds of transaction; and a controller which, in a case where an operation to select at least some of the plurality of kinds of valuable media is received, operates at least some of the plurality of devices corresponding to the selected at least some of plurality of kinds of valuable media, respectively, in a first mode that causes the at least some of the plurality of devices to start the processing in an order that is determined based on a distance between the display and the at least some of the plurality of devices.

13. The valuable medium processing apparatus according to claim 12, wherein
in a case where the depositing transaction is selected, the controller causes the plurality of devices in descending order of distance from the display to start the processing.

14. The valuable medium processing apparatus according to claim 12, wherein
in a case where the dispensing transaction is selected, the controller causes the plurality of devices in ascending order of distance from the display to start the processing.

15. A valuable medium processing apparatus, comprising:
a plurality of devices each of which performs processing related to at least one of a plurality of kinds of valuable media, the plurality of kinds of valuable media comprising at least two kinds among a rolled coin, a loose coin, a banknote, and a cheque;

an input device which receives an operation to select at least one of a plurality of kinds of transactions and at least one of the plurality of kinds of valuable media, the plurality of kinds of transactions comprising a depositing transaction of depositing the plurality of kinds of valuable media into the valuable medium processing apparatus and a dispensing transaction of dispensing the plurality of kinds of valuable media from the valuable medium processing apparatus; and a controller which, in a case where an operation to select at least some of the plurality of kinds of valuable media is received, is operable in an operation mode among a plurality of operation modes comprising a first operation mode and a second operation mode, wherein:
the first operation mode is a mode that causes at least some of the plurality of devices corresponding to the selected at least some of plurality of kinds of valuable media, respectively, to start the processing in an order that is predetermined, the second operation mode is a mode that causes the at least some of the plurality of devices, respectively, to perform the processing in parallel, and the controller causes the operation mode to transition based on a predetermined condition, the predetermined condition being related to an attribute of a user who utilizes the valuable medium processing apparatus.

* * * * *